United States Patent [19]

Siddiqui

[11] Patent Number: 5,700,973
[45] Date of Patent: Dec. 23, 1997

[54] GAS INFLATOR HAVING ALUMINUM BEAD FILTER

[75] Inventor: Shahid A. Siddiqui, Canton, Mich.

[73] Assignee: Automotive Systems Laboratory, Inc., Farmington Hills, Mich.

[21] Appl. No.: 747,342

[22] Filed: Nov. 13, 1996

[51] Int. Cl.⁶ ............................................. C06D 5/00
[52] U.S. Cl. ............................................. 102/530; 280/741
[58] Field of Search ............................ 102/530, 531; 280/741

[56] References Cited

U.S. PATENT DOCUMENTS

| | | | |
|---|---|---|---|
| 34,615 | 3/1862 | Shannon . | |
| 2,529,791 | 11/1950 | Whitworth et al. | 102/39 |
| 3,726,220 | 4/1973 | MacDonald et al. | 102/39 |
| 3,739,574 | 6/1973 | Godfrey | 60/39.03 |
| 3,797,854 | 3/1974 | Poole et al. | 280/150 |
| 4,109,578 | 8/1978 | Goetz | 280/741 |
| 4,296,084 | 10/1981 | Adams et al. | 423/351 |
| 4,414,902 | 11/1983 | Strasser et al. | 102/531 |
| 4,530,516 | 7/1985 | Adams et al. | 280/741 |
| 4,561,675 | 12/1985 | Adams et al. | 280/734 |
| 4,722,551 | 2/1988 | Adams | 280/736 |
| 4,943,086 | 7/1990 | Cunningham | 280/741 |
| 5,005,486 | 4/1991 | Lenzen | 102/531 |
| 5,009,855 | 4/1991 | Nilsson | 422/164 |
| 5,033,390 | 7/1991 | Minert et al. | 102/530 |
| 5,062,367 | 11/1991 | Hayashi et al. | 102/530 |
| 5,215,721 | 6/1993 | Tasaki et al. | 102/530 |
| 5,268,013 | 12/1993 | Bruncher et al. | 422/164 |
| 5,275,433 | 1/1994 | Klober et al. | 280/741 |
| 5,345,875 | 9/1994 | Anderson | 102/530 |
| 5,397,543 | 3/1995 | Anderson | 422/165 |

FOREIGN PATENT DOCUMENTS

| 6201299 | 7/1994 | Japan | 102/530 |
|---|---|---|---|

*Primary Examiner*—Stephen M. Johnson
*Attorney, Agent, or Firm*—Lyon, P.C.

[57] ABSTRACT

A solid propellant gas generator incorporating staged gas cooling and filtration so as to generate cool, clean gasses having a composition suitable for use as an automobile airbag inflator. An intermediate cooling and filtration stage consists of aluminum beads that function as both a filter and heat sink.

2 Claims, 1 Drawing Sheet

GAS INFLATOR HAVING ALUMINUM BEAD FILTER

BACKGROUND OF THE INVENTION

The present invention relates generally to gas inflators for automotive passenger restraint systems, and more specifically, to a gas filter for improved filtration of solids and reduction of toxic gasses.

The composition of the gas stream emanating from an automobile airbag inflator is subject to strict requirements to avoid toxicity concerns. Generally, solid propellant gas generators produce unacceptable byproducts which must be removed from the gas stream prior to exiting the gas generator. Due to the high temperatures involved in burning solid propellants, many of the unacceptable byproducts are in the form of liquids or gasses which are difficult to remove unless the gasses are cooled to where the undesirable byproducts convert to solids, which can be filtered out, or to liquids, which solidify in contact with cool surfaces of the gas generator.

The conventional approach to solving the aforesaid problem has been to direct the hot propellant gasses directly into a coolant/filter mass and rapidly cool the gasses down in a single step to the point where the undesirable solid liquid byproducts are removed. However, a problem is presented by this approach in that rapid cooling of the gasses may stabilize the gas combustion equilibrium in a manner that leads to unacceptably high levels of undesired gasses.

For example, in airbag inflators, low levels of NO and CO in the effluent gasses are mandated. When a stoichiometric propellant containing N, C and O is burned, the quantity of NO and CO produced is a function of the propellant combustion temperature. More CO and NO is formed at higher temperatures. If, as in a conventional system, the combustion gasses are quenched in a single step to a temperature at which the gas reaction rates are reduced to essentially zero, combustion will not go to completion, and unacceptably high CO and NO levels resulting from the combustion temperature equilibrium condition may be produced.

As a solution to the problems described, multistage cooling filters have been designed. However, inefficient heat transfer and filter clogging are concerns still driving improvements in filter design.

SUMMARY OF THE INVENTION

The aforesaid problems are solved, in accordance with a preferred constructed embodiment of the present invention, by a multistaged filter comprising an aluminum bead filter disposed around a propellant chamber of a conventional gas inflator. The plurality of aluminum beads operates, in conjunction with a primary expanded metal filter, as a secondary filter and as a heat sink. By cooling the propellant combustion gasses in stages and providing sufficient residence time within the generator, the CO and NO equilibrium conditions are shifted to relatively low, acceptable, CO and NO concentrations.

Figure 1:
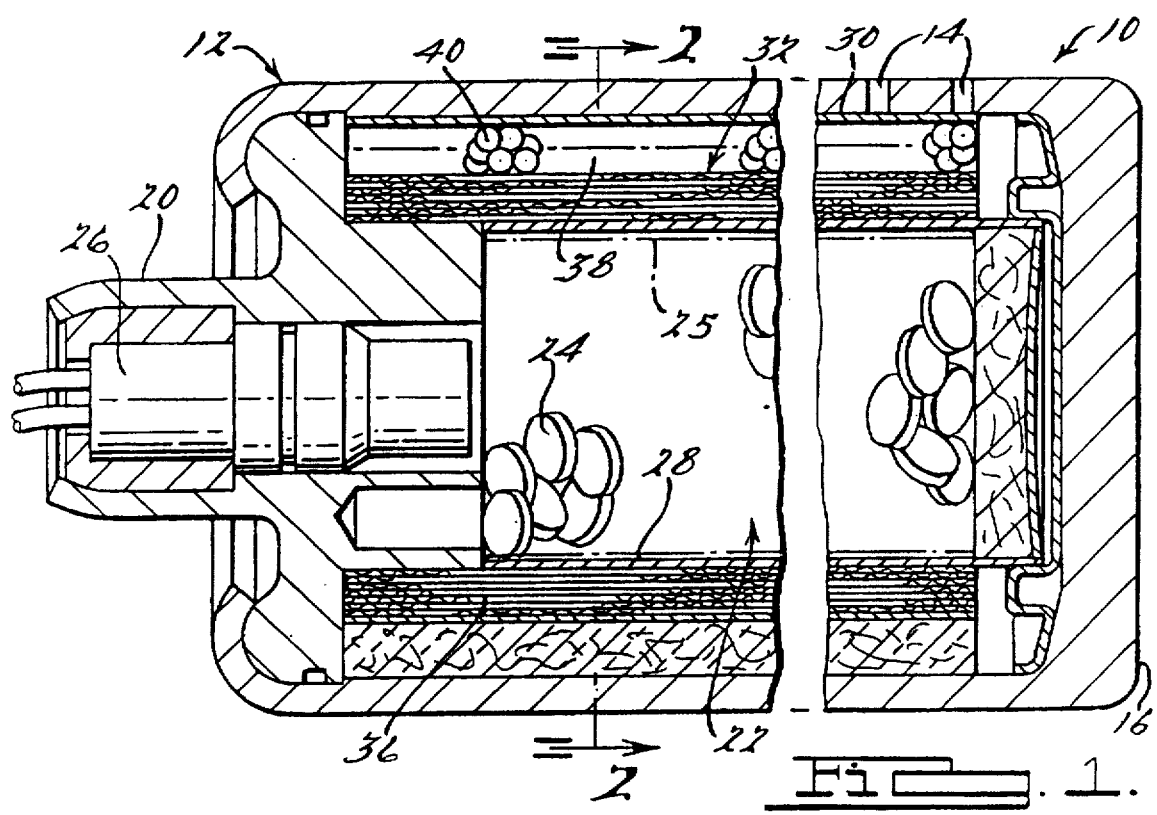
FIG. 1 is a cross-sectional view of a gas generator in accordance with the present invention.

DETAILED DESCRIPTION OF THE PREFERRED EMBODIMENT(S).

As seen in the drawings, a gas generator 10, in accordance with an exemplary constructed embodiment of the invention, comprises a housing 12, for example, an aluminum forging. The housing 12 is provided with a plurality of gas discharge nozzles 14, arranged in two circumferentially and homolaterally extending rows, and spaced apart approximately 180° relative to one another. The housing 12 has an integral end closure 16 at one end and an end closure 20 at the opposite end that is crimped in place. A perforated propellant chamber 22 is centrally and longitudinally disposed within the housing 12 for containment of propellant grains 24. The inside of the propellant chamber 22 may be provided with a burst foil 25 covering the perforated portions of chamber 22, which facilitates pressure buildup and flame front propagation through the propellant grains 24. The end closure 20 accepts an electrical squib 26 wherein the squib 26 facilitates electric ignition of propellant grains 24. The propellant chamber 22 is surrounded by a first filter screen 28 comprising stainless steel.

In accordance with one feature of the invention, baffle tube 30, preferably aluminum, is telescoped about the propellant chamber 22 in radially spaced relation to the slagging screen 28 thereon and juxtaposed to the housing 12. A second filter screen 32, preferably aluminum, defines a first plenum 34 radially outward from the slagging screen 28. In a preferred embodiment, a wound expanded metal mesh 36 comprised of one or more layers of 16–20 mesh stainless steel wire having a wire diameter of 0.032 in. (≈0.08 cm.) fills the first plenum 34 and is radially constrained by second filter screen 32. A second plenum 38 is formed between second filter screen 32 and baffle tube 30. A bed of aluminum beads or alumina beads 40, for example, Draisel Beads ($Al_2O_3$), obtainable from Draiswerke Inc., Mahwah, N.J., fills plenum 38, and provides a heat sink and further filtering means.

Figure 2:
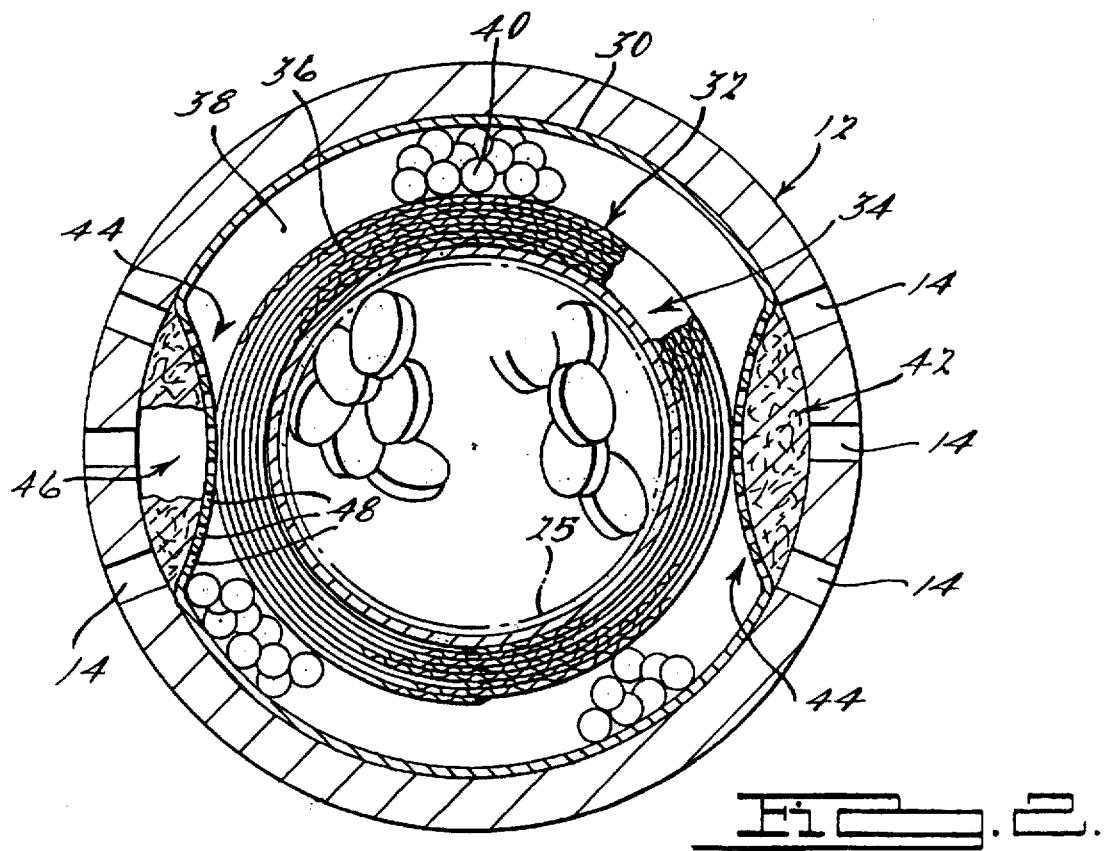
FIG. 2 is a cross-sectional view taken along the line 2—2 of FIG. 1.

Ceramic filters 42, for example, Unifrax #204LE, obtainable from Unifrax Corporation, Niagara, N.Y., are evenly and arcuately spaced about baffle tube 30, and are longitudinally disposed about propellant chamber 22. In the embodiment shown in FIG. 2, two ceramic filters 42 are circumferentially orientated 180° from one another. However, if additional ceramic filters were desired, such as four different filters, the filters would then be spaced 90° apart.

Arcuate edges 44 are formed where baffle tube 30 bows radially inward at the inner edge of each ceramic filter 42. Longitudinal concave cavities 46, formed between the housing 12 and the arcuate edges 44, provide for disposition of ceramic filters 42. A plurality of apertures 48 are evenly spaced along the arcuate edges 44 of baffle tube 30, thereby providing a gas flow path into the ceramic filters 42. The apertures 48 and the discharge nozzles –are positioned on inner and outer edges of ceramic filters 42, respectively, and provide for gaseous flow through and out the ceramic filters 42.

In operation, gasses radially exiting from the propellant chamber 22 flow through the surrounding slagging screen 28 and enter the plenum 34 filled With wound expanded metal mesh 36. Both liquids and solids in the gas stream are cooled and deposited, or filtered, as the gas radially migrates through the metal mesh 36. The gasses then radially flow through second filtering screen 32 into aluminum beads 40 wherein the gasses are further cooled and filtered. Thereafter, the gasses flow circumferentially through the bed of aluminum beads 40 to the apertures 48 of baffle tube 30, thence radially outward through the apertures 48 in the baffle tube 30, thence outwardly through the ceramic filters 42 to radially exit through discharge nozzles 14 of housing 12.

While the preferred embodiment of the invention has been disclosed, it should be appreciated that the invention is susceptible of modification without departing from the scope of the following claims.

I claim:

1. A gas generator comprising:
   a housing having a plurality of gas discharge nozzles;
   a propellant chamber located within said housing for holding a propellant charge, said chamber having a plurality of apertures therein;
   means for igniting said propellant charge; and
   a multistage filter in fluid communication with said plurality of apertures and said plurality of gas discharge nozzles, said multistage filter comprising:
      a first filtration stage comprising an expanded metal mesh filter;
      a second filtration stage comprising a plurality of aluminum beads for the filtration and heat retention of gas therein; and
      a third filtration stage comprising a plurality of ceramic filters,
   wherein gasses produced by ignition of said propellant charge flow through said plurality of apertures into said expanded metal mesh filter, thence through said plurality of aluminum beads, thence through said ceramic filters, thence outward through said discharge nozzles in said housing.

2. A gas generator in accordance with claim 1 including a burst foil on the interior of said propellant chamber.

* * * * *